United States Patent

Burmester et al.

(10) Patent No.: US 8,868,782 B2
(45) Date of Patent: Oct. 21, 2014

(54) SYSTEM AND METHODS FOR A MANAGED APPLICATION SERVER RESTART

(75) Inventors: Andreas Burmester, Stockholm (SE); Adrian Szwej, Alvsjo (SE); Jan Anders Tellinger, Alvsjo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 197 days.

(21) Appl. No.: 13/255,368

(22) PCT Filed: Mar. 10, 2009

(86) PCT No.: PCT/IB2009/000485
§ 371 (c)(1),
(2), (4) Date: Sep. 8, 2011

(87) PCT Pub. No.: WO2010/103341
PCT Pub. Date: Sep. 16, 2010

(65) Prior Publication Data
US 2011/0320633 A1 Dec. 29, 2011

(51) Int. Cl.
G06F 15/173 (2006.01)
H04L 12/841 (2013.01)
G06F 9/50 (2006.01)
H04L 12/825 (2013.01)
H04L 12/801 (2013.01)

(52) U.S. Cl.
CPC ............... *G06F 9/505* (2013.01); *H04L 47/28* (2013.01); *H04L 47/266* (2013.01); *H04L 47/10* (2013.01)
USPC ........................................... 709/239

(58) Field of Classification Search
CPC ........ H04L 29/14; H04L 47/266; G06F 9/505
USPC .......................................... 709/224, 238, 239
See application file for complete search history.

(56) References Cited

U.S. PATENT DOCUMENTS

| | | | | |
|---|---|---|---|---|
| 6,101,508 A | * | 8/2000 | Wolff | 709/223 |
| 6,775,692 B1 | * | 8/2004 | Albert et al. | 709/207 |
| 7,055,063 B2 | * | 5/2006 | Leymann et al. | 714/16 |
| 7,093,004 B2 | * | 8/2006 | Bernardin et al. | 709/219 |
| 7,159,022 B2 | * | 1/2007 | Primm et al. | 709/224 |
| 7,188,163 B2 | * | 3/2007 | Srinivasan et al. | 709/221 |
| 7,206,805 B1 | * | 4/2007 | McLaughlin, Jr. | 709/203 |
| 7,213,062 B1 | * | 5/2007 | Raciborski et al. | 709/223 |
| 7,233,989 B2 | * | 6/2007 | Srivastava et al. | 709/224 |
| 7,443,796 B1 | * | 10/2008 | Albert et al. | 370/235 |
| 7,680,928 B2 | * | 3/2010 | Lean et al. | 709/224 |

(Continued)

FOREIGN PATENT DOCUMENTS

| | | |
|---|---|---|
| GB | 2309558 A | 7/1997 |
| WO | 0074338 A2 | 12/2000 |

*Primary Examiner* — Kevin Bates
*Assistant Examiner* — Clarence D McCray
(74) *Attorney, Agent, or Firm* — Rothwell, Figg, Ernst & Manbeck P.C.

(57) ABSTRACT

Systems and methods for managing the traffic handled by an application server while the application server is in the process of restarting is disclosed. An application server has a plurality of internal processing units. When the application server is restarted, it signals a forwarding node to cease forwarding traffic to the internal processing units. When all of the nodes are ready, or at the expiration of a predetermined time interval, the application server signals the forwarding node to resume forwarding traffic to the internal processing units.

19 Claims, 3 Drawing Sheets

(56) References Cited

U.S. PATENT DOCUMENTS

| | | | |
|---|---|---|---|
| 7,865,596 B2* | 1/2011 | Grosner et al. | 709/226 |
| 7,870,153 B2* | 1/2011 | Croft et al. | 707/781 |
| 8,484,372 B1* | 7/2013 | Callon | 709/238 |
| 2002/0019844 A1* | 2/2002 | Kurowski et al. | 709/201 |
| 2002/0124081 A1* | 9/2002 | Primm et al. | 709/224 |
| 2002/0156893 A1* | 10/2002 | Pouyoul et al. | 709/225 |
| 2002/0161907 A1* | 10/2002 | Moon | 709/230 |
| 2003/0144894 A1* | 7/2003 | Robertson et al. | 705/8 |
| 2003/0154284 A1* | 8/2003 | Bernardin et al. | 709/226 |
| 2003/0191795 A1* | 10/2003 | Bernardin et al. | 709/105 |
| 2003/0225904 A1 | 12/2003 | Kanno et al. | |
| 2006/0041660 A1* | 2/2006 | Bishop et al. | 709/224 |
| 2007/0174429 A1* | 7/2007 | Mazzaferri et al. | 709/218 |
| 2007/0198656 A1* | 8/2007 | Mazzaferri et al. | 709/218 |
| 2011/0320633 A1* | 12/2011 | Burmester et al. | 709/239 |

* cited by examiner

SYSTEM AND METHODS FOR A MANAGED APPLICATION SERVER RESTART

CROSS REFERENCE TO RELATED APPLICATION(S)

This application is a 35 U.S.C. §371 National Phase Entry Application from PCT/IB2009/000485, filed Mar. 10, 2009, designating the United States, the disclosure of which is incorporated herein in its entirety by reference.

TECHNICAL FIELD

The present invention relates to the field of information systems. More specifically, aspects of the present invention relate to systems and methods for managing the traffic of application servers during a system restart.

BACKGROUND

Application servers may provide remote clients with access to applications executing on the application server via a communications network. An application server is often configured to execute multiple concurrent processes. For example, an application server may be configured to service a plurality of clients simultaneously, provide a plurality of services to a single client, or a combination of these. The ability to execute multiple concurrent processes can be achieved by employing a plurality of internal processing units, each of which may independently execute one or more server applications and independently manage traffic with an external network. The internal processing units may be physically distinct (e.g. separate microprocessors) and/or logically distinct (e.g. virtual machines).

It is desirable that the communications load of an application server is balanced among the internal processing units so that all of the resources available to the application server are used efficiently. As a new connection is created with a client, the connection may be allocated to an available internal processing unit using load balancing algorithms to ensure an approximate balance across all of the internal processing units.

When an application server is initialized (e.g., booted up) it is often the case that the internal processing units become operational at different times. Because each internal processing unit may be executing different types of processes, each unit may intrinsically require a different initialization period. Additionally, various hardware and software logistical considerations (e.g. bus queues, shared resources, etc.) may cause further differences between the times at which various of the internal processing units are ready to receive traffic.

Conventional methods for managing traffic to an application server while the server is initializing will start accepting connections once any internal processing unit is available. Ideally, this management technique would result in the least amount of delay between the system restart and when the application server can begin to accept traffic.

When the application server first becomes available (i.e., when the first internal processing unit is ready to receive traffic), many of the internal processing units may still be unavailable. Traffic that would otherwise be handled by the unavailable internal processing units is distributed over the internal processing units that are ready to receive traffic according to the application server's failover principles. This may result in an unbalanced situation (e.g., a situation where some internal processing units process many transactions in a given period of time while other units process few if any transaction during that same period of time). This uneven distribution can negatively affect system performance.

This situation is exacerbated because an application server will often restart in response to an overload situation. For example, when there is a lot of traffic, there is a risk that the system may exhaust its available memory or that latency may exceed acceptable limits. The system will attempt to recover by initiating a system restart. However, the external stimuli (e.g., traffic from clients) may still be too high when some, but not all, the internal processing units are ready to receive traffic. This high amount of traffic (which was high enough to overtax the entire application server) may be concentrated among the more limited resources of the internal processing units that are first ready to receive traffic after the system restart. Furthermore, the application server will also be executing whatever processing is necessary for restarting the system, including the internal processing units. This high demand situation is likely to cause another system restart.

SUMMARY

Aspects of the invention provide systems and methods for balancing the load in an application server having multiple internal processing units. In some embodiments, the load is balanced by ceasing forwarding traffic to the application server in response the detection of a restart of the application server and resuming forwarding traffic to the application server only after a desired amount of internal processing units are ready to receive traffic or a certain amount of time has elapsed since the detection of the restart condition. In this way, the application server will be restarted in a more load balanced way because more internal processing units will be up and running when traffic is routed towards the application server. Additionally, the application server can spend additional resources for recovery actions to get a stable and consistent state before receiving externally initiated traffic. This can make recovery from a restart faster and reduce the risk for cyclic restarts. In some embodiments, the use of a server manager application to manage traffic to the internal processing units obviates the need for the internal processing units to monitor the state of the application server's communication ports or to be configured to detect whether the communication ports are disabled.

Thus, in one aspect, the invention provides an improved application server. In some embodiments, the improved application server includes: a first internal processing unit (e.g., a virtual machine, such as a Java virtual machine (JVM), or microprocessor) operable to execute a first server application; a second internal processing unit (e.g., a java virtual machine or microprocessor) operable to execute a second server application; and a server manager application. Advantageously, the server manager application is configured to: (1) transmit to a forwarding node (e.g., router, switch or other forwarding node) a first message in response to the server manager application detecting a restart of the application server, said first message for causing the forwarding node to cease forwarding traffic to said internal processing units, (2) set a timer to expire as soon as a certain amount of time has elapsed after the application server restarts, and (3) transmit to the forwarding node a second message in response to (a) detecting the expiration of the timer or (b) detecting that at least each of said internal processing units is ready to receive traffic, said second message for causing the forwarding node to resume forwarding traffic to said internal processing units. In some embodiments, the server manager application is configured to detect a restart of the application server using any combination of watchdog processes, heartbeats and socket supervision In some embodiments, the server manager application is configured to transmit the second message to the forwarding node in response to (a) detecting the expiration of the timer or (b) detecting that all internal processing units within the application server are ready to receive traffic. In some embodiments, the server manager application is operable to communicate with each said internal processing unit. In some embodiments, each said internal processing unit is configured to notify the server manager application as soon as the internal processing unit is ready to receive traffic. In some embodiments, the certain amount of time is no less than the average amount of time it takes for an internal processing unit to recover from a restart. In some embodiments, the first message causes the forwarding node to cease transmitting any traffic to the application server.

In another aspect, the invention provides a method for operating an application server. In some embodiments, the method includes the following steps: (1) detecting a restart of the application server; transmitting to a forwarding node a first message in response to detecting the restart of the application server, said first message causing the forwarding node to cease forwarding traffic to a set of two or more internal processing units of the application server; (2) setting a timer to expire as soon as a certain amount of time has elapsed after restart of the application server; (3) detecting the expiration of the timer or detecting that each of said internal processing units is ready to receive traffic; and (4) transmitting to the forwarding node a second message in response to detecting the expiration of the timer or detecting that each of said internal processing units is ready to receive traffic, said second message causing the forwarding node to resume forwarding traffic to said internal processing units.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
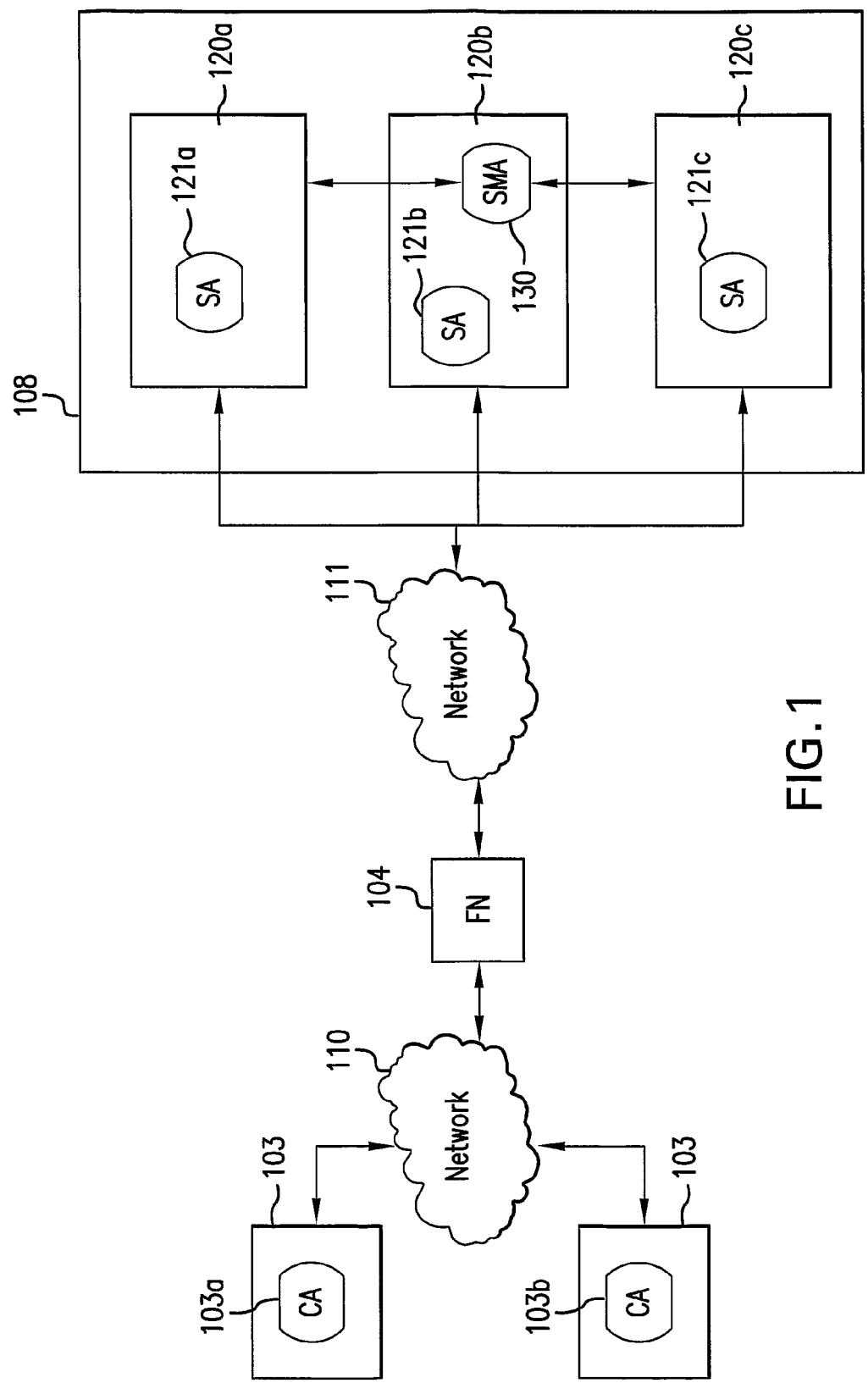
FIG. 1 illustrates a system according to an embodiment of the invention.

Referring to FIG. 1, FIG. 1 illustrates an application server 108 connected to client devices 103 via a forwarding node 104. As shown in FIG. 1, the application server 108 includes a plurality of internal processing units 120a, 120b, 120c capable of independently executing applications. Each of the internal processing units 120a, 120b, 120c may be executing distinct server applications 121a, 121b, 121c, respectively. The server applications 121 are capable of communicating with client applications 103a, 103b executing on the client devices 103 via communication networks 110 and 111.

In some embodiments, an internal processing unit 120 may be a virtual machine, such as a Java™ virtual machine, executing on a single processor or a number of processors. In alternate embodiments, an internal processing unit 120 may be a hardware component and operating system.

As further shown in FIG. 1, application server 108 may include a server manager application (SMA) 130. In the embodiment depicted in FIG. 1, SMA 130 is executed by an internal processing unit 120b that is also executing a server application 121b. In alternate embodiments, SMA 130 may execute by itself on a dedicated internal processing unit or may be executed by an additional processor other than one of the internal processing units 120. In some embodiments, SMA 130 is able to communicate with each of the internal processing units 120. In some embodiments, each of the internal processing units 120 is configured to notify SMA 130 as soon as the processing unit is ready to receive traffic.

As further illustrated in FIG. 1, traffic between the client devices 103 and the internal processing units 120 may pass through forwarding node 104. The forwarding node 104 may be configured to direct packets transmitted from clients 103 to an appropriate internal processing unit 120 based upon the type of packet, whether the client device 103 has specified a particular internal processing unit as a target of the packet, processing unit availability, load balancing considerations, addressing information in the packet, and the like. In some embodiments, the forwarding node 104 is a router or a switch.

Figure 2:
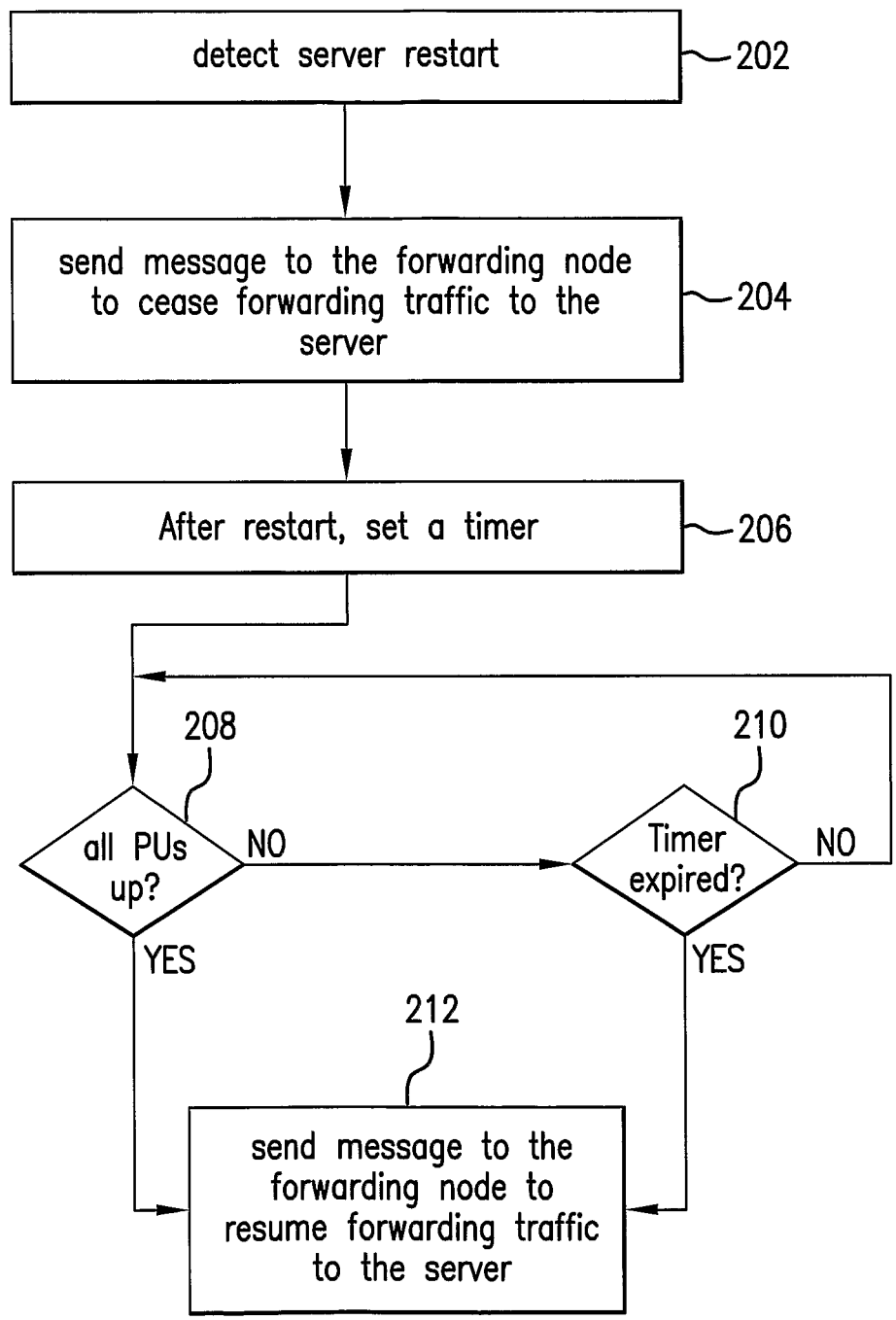
FIG. 2 is a flow chart illustrating a process according to some embodiments of the invention.

Referring now to FIG. 2, FIG. 2 illustrates a process 200 for managing an application server 108 during a restart. In some embodiments, process 200 may be performed by the SMA 130. Process 200 may begin in step 202, where SMA 130 detects a restart of application server 108. SMA 130 may be configured to detect a restart of application server 108 using any combination watchdog processes, heartbeats and socket supervision.

In response to detecting the restart, SMA 130 sends a message to forwarding node 104. This message causes forwarding node 104 to cease forwarding all traffic to the internal processing units 120 of application server 108. In some embodiments, this message may cause the forwarding node 104 to cease forwarding all traffic to application server 108.

In addition to sending the message to forwarding 104 in response to detecting the restart, SMA 130 also sets a timer to expire immediately after a certain time interval has elapsed (e.g., at 1 minute) in response to detecting the restart (step 206). The time interval indicates at what point the application server 108 will resume accepting traffic regardless of whether all of the internal processing units 120 are ready to handle traffic. In some embodiments, this time interval may be equal to or greater than the average amount of time it takes for an internal processing unit to recover from a restart. In some embodiments, this time interval may be equal to or greater than the expected maximum amount of time it takes for an internal processing unit to recover from a restart. In some embodiments, SMA 130 sets the timer merely by recording the current time.

At step 208, SMA 130 determines whether all, or some predetermined number, of internal processing units 120 are operational. For example, in some embodiments, as discussed above, each internal processing unit 120 notifies SMA 130 as soon as the internal processing unit 120 is operational. Accordingly, in these embodiments, SMA 130 may determine whether the appropriate number of internal processing units 120 is operational by maintaining a count of the processing units that have notified SMA 130 of their operational status.

In response to determining that the predetermined number of internal processing units 120 is operational, process 202 proceeds to step 212, otherwise process 200 proceeds to step 210. In step 210, SMA 130 determines whether the timer has expired. In the embodiments where SMA 130 sets the timer merely by recording the current time, SMA 130 may determine whether the timer has expired by determining the current time to check whether the time interval elapsed since the timer was set. If the timer has not expired, process 200 returns to step 208, otherwise process 200 proceeds to step 212. In step 212, SMA 130 sends another message to forwarding node 104. This message causes forwarding node 104 to resume forwarding traffic to the internal processing units 120 of the application server 108.

In the above manner, application server 108 will be restarted in a proper, load balanced way because all (or some predetermined number) of the internal processing units 120 will be up and running when traffic is once again routed to application sever 108.

Figure 3:
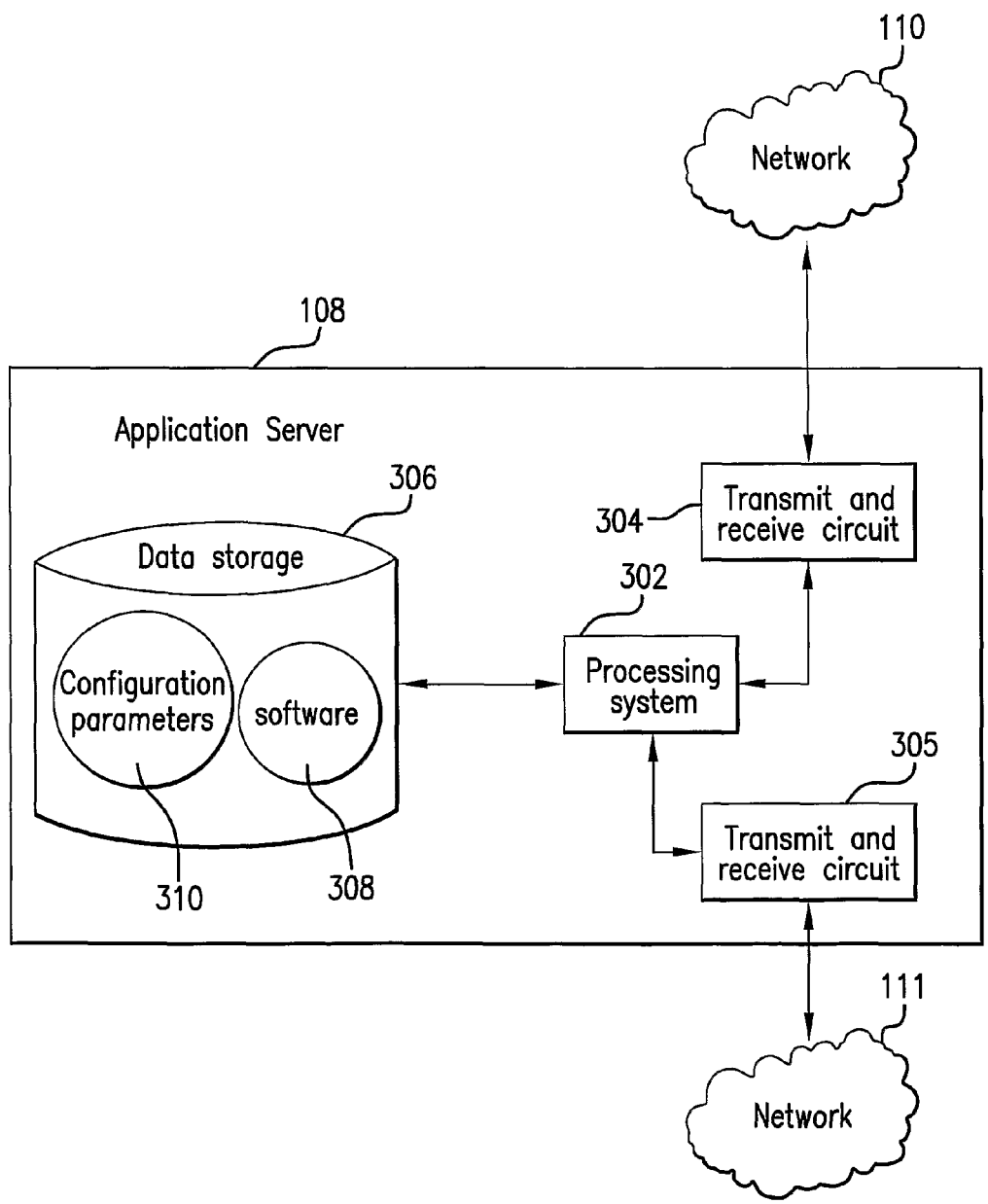
FIG. 3 is a block diagram of an application server.

Referring now to FIG. 3, FIG. 3 is a functional block diagram of an application server 108 according to some embodiments of the invention. As shown, the application server 108 may comprise a data processing system 302 (e.g., one or more microprocessors), a data storage system 306 (e.g., one or more non-volatile storage devices) and computer software 308 stored on the storage system 306 (e.g., software for implementing SMA 130). Configuration parameters 310 (e.g., the time interval) may also be stored in storage system 306. The application server 108 also includes transmit/receive (Tx/Rx) circuitry 304 and 305 for transmitting data to and receiving data from network 110, and 111, respectively.

The software 308 is configured such that when the processing system 302 executes software 308, application server 108 performs steps described herein (e.g., steps described above with reference to the flow chart shown in FIG. 2). For example, the software 308 may include: (1) computer instructions for transmitting to forwarding node 104 a first message in response to the detection of a restart of application server 108, where the first message causes the forwarding node 140 to cease forwarding traffic to the internal processing units of application server 108; (2) computer instructions for setting a timer to expire as soon as a certain amount of time has elapsed after the application server restarts, and computer instructions for (3) transmitting to the forwarding node a second message in response to (a) detecting the expiration of the timer or (b) detecting that at least some predetermined number of the internal processing units 120 (e.g., all of the internal processing units 120) are ready to receive traffic, where the second message causes the forwarding node to resume forwarding traffic to the internal processing units 120.

While various embodiments of the present invention have been described above, it should be understood that they have been presented by way of example only, and not limitation. Thus, the breadth and scope of the present invention should not be limited by any of the above described exemplary embodiments.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. An application server, comprising: a first internal processing unit operable to execute a first server application; a second internal processing unit operable to execute a second server application; and a server manager application, wherein the server manager application is configured to: (1) transmit to a forwarding node a first message in response to the server manager application detecting a restart of the application server, said first message for causing the forwarding node to cease forwarding traffic to said internal processing units, (2) set a timer to expire as soon as a certain amount of time has elapsed after the application server restarts, and (3) transmit to the forwarding node a second message in response to (a) detecting the expiration of the timer or (b) detecting that at least one of said internal processing traits is ready to receive traffic, whichever occurs first, said second message for causing the forwarding node to resume forwarding traffic to said internal processing timer.

2. The application server of claim 1, wherein
the server manager application is configured to transmit the second message to the forwarding node in response to detecting that all internal processing units within the application server are ready to receive traffic, and
the server manager application is further configured to transmit the second message to the forwarding node in response to detecting the expiration of the timer.

3. The application server of claim 1, wherein the first internal processing unit comprises a virtual machine and the second internal processing unit comprises a virtual machine.

4. The application server of claim 1, wherein the first internal processing unit is a microprocessor and the second internal processing unit is a microprocessor.

5. The application server of claim 1, wherein the forwarding node is a router or a switch.

6. The application server of claim 1, wherein the server manager application is operable to communicate with each said internal processing unit.

7. The application server of claim 6, wherein each said internal processing unit is configured to notify the server manager application as soon as the internal processing unit is ready to receive traffic.

8. The application server of claim 1, wherein the certain amount of time is no less than a predetermined average amount of time it takes for an internal processing unit to recover from a restart.

9. The application server of claim 1, wherein the first message causes the forwarding node to cease transmitting any traffic to the application server.

10. The application server of claim 1, wherein the server manager application is configured to detect a system restart using any combination of watchdog processes, heartbeats and socket supervision.

11. A method for operating an application server, comprising: detecting a restart of the application server; transmitting to a forwarding node a first message in response to detecting the restart of the application server, said first message causing the forwarding node to cease forwarding traffic to a set of two or more internal processing traits of the application server; setting a timer to expire as soon as a certain amount of time has elapsed after restart of the application server; detecting the expiration of the timer or detecting that each of said internal processing units is ready to receive traffic; and transmitting to the forwarding node a second message in response to detecting the expiration of the timer or detecting that each of said internal processing traits is ready to receive traffic, whichever occurs first, said second message causing the forwarding node to resume forwarding traffic to said internal processing units.

12. The method of claim 11, wherein said set of internal processing units comprises all of the internal processing units within the application server.

13. The method of any claim 11, wherein a first internal processing unit within the set comprises a virtual machine and a second internal processing unit within the set comprises a virtual machine.

14. The method of claim 11, wherein a first internal processing unit within the set is a microprocessor and a second internal processing unit within the set is a microprocessor.

15. The method of claim 11, wherein the forwarding node is a router or a switch.

16. The method of claim 11, wherein the method is performed by a server manager application executing in the application server and the server manager application is operable to communicate with each said internal processing unit.

17. The method of claim 16, wherein each said internal processing unit is configured to notify the server manager application as soon as the internal processing unit is ready to receive traffic.

18. The method of claim 11, wherein the certain amount of time is no less than a predetermined average amount of time it takes for an internal processing unit to recover from a restart.

19. The method of claim 11, wherein the first message causes the forwarding node to cease transmitting any traffic to the application server.

* * * * *